United States Patent
Hennessey

(10) Patent No.: US 10,695,702 B2
(45) Date of Patent: Jun. 30, 2020

(54) BLOOD SEPARATION MEDIA AND LATERAL FLOW DEVICES FOR BLOOD SAMPLES

(71) Applicant: AHLSTROM-MUNKSJÖ OYJ, Helsinki (FI)

(72) Inventor: William Hennessey, Carlisle, PA (US)

(73) Assignee: AHLSTROM-MUNKSJÖ OYJ, Helsinki (FI)

( * ) Notice: Subject to any disclaimer, the term of this patent is extended or adjusted under 35 U.S.C. 154(b) by 75 days.

(21) Appl. No.: 15/745,511

(22) PCT Filed: Jul. 25, 2016

(86) PCT No.: PCT/FI2016/050543
§ 371 (c)(1),
(2) Date: Jan. 17, 2018

(87) PCT Pub. No.: WO2017/017314
PCT Pub. Date: Feb. 2, 2017

(65) Prior Publication Data
US 2018/0207564 A1     Jul. 26, 2018

(30) Foreign Application Priority Data
Jul. 24, 2015  (FI) ...................................... 20155565

(51) Int. Cl.
*G01N 1/00*  (2006.01)
*B01D 39/16*  (2006.01)
(Continued)

(52) U.S. Cl.
CPC ........... *B01D 39/163* (2013.01); *B01D 39/18* (2013.01); *B01D 39/2024* (2013.01);
(Continued)

(58) Field of Classification Search
CPC ........................................................ B01L 1/00
See application file for complete search history.

(56) References Cited

U.S. PATENT DOCUMENTS

| 4,477,575 A | 10/1984 | Vogel et al. |
| 4,816,224 A | 3/1989 | Vogel et al. |

(Continued)

FOREIGN PATENT DOCUMENTS

| CN | 1202621 | 12/1998 |
| CN | 1261290 | 7/2000 |

(Continued)

OTHER PUBLICATIONS

International Search Report for PCT/FI2016/050543 dated Nov. 3, 2015, 3 pages.

(Continued)

*Primary Examiner* — Jyoti Nagpaul
(74) *Attorney, Agent, or Firm* — Nixon & Vanderhye P.C.

(57) ABSTRACT

Blood separation media include a fibrous web formed by 50 to 99 parts by weight of glass microfibers, and 1 to 50 parts by weight of fibrillated fibers; a polymeric, hydrophilic binder; a wetting agent; and a salt. The binder covers at least a part of the glass microfibers, and the web is further impregnated with a wetting agent and it contains a salt which is capable of crenating red blood cells. The pore size of the media is smaller than the average pore size of red blood cells. Compared to conventional separation media, the invention will improve efficiency of the separation of the red blood cells from the plasma and increase the speed and volume of the separated material. The present invention also provides for a decrease in lysing of the red blood cells during the filtration process which gives improved purity of the material.

26 Claims, 1 Drawing Sheet

(51) Int. Cl.
  *B01D 39/18* (2006.01)
  *B01D 39/20* (2006.01)
  *B01L 3/00* (2006.01)
  *G01N 1/34* (2006.01)

(52) U.S. Cl.
  CPC .............. *B01L 3/5023* (2013.01); *G01N 1/34* (2013.01); *B01D 2239/0421* (2013.01); *B01D 2239/064* (2013.01); *B01D 2239/0636* (2013.01); *B01D 2239/086* (2013.01); *B01D 2239/1216* (2013.01); *B01D 2239/1225* (2013.01); *B01D 2239/1233* (2013.01); *B01L 2200/0631* (2013.01); *B01L 2200/141* (2013.01); *B01L 2300/12* (2013.01)

(56) References Cited

U.S. PATENT DOCUMENTS

| | | |
|---|---|---|
| 5,186,843 A | 2/1993 | Baumgardner et al. |
| 5,454,946 A * | 10/1995 | Heagle ................. B01D 39/083 210/503 |
| 2003/0175153 A1 | 9/2003 | Anaokar et al. |
| 2004/0023399 A1 | 2/2004 | Grzeda et al. |
| 2004/0232067 A1 | 11/2004 | Simon |
| 2012/0152859 A1 | 6/2012 | Battenfeld et al. |
| 2014/0017672 A1 * | 1/2014 | Holmberg ............. B01L 3/5025 435/5 |

FOREIGN PATENT DOCUMENTS

| | | |
|---|---|---|
| WO | WO 03/008933 | 1/2003 |
| WO | WO 2015/014974 | 2/2015 |

OTHER PUBLICATIONS

Written Opinion of the ISA for PCT/FI2016/050543 dated Nov. 3, 2015, 5 pages.
FI Search Report for 20155565 dated Feb. 10, 2016, 2 pages.
Office Action issued in China, Application No. 201680055881.4, dated Nov. 29, 2019 (with translation), 13 pages.

* cited by examiner

BLOOD SEPARATION MEDIA AND LATERAL FLOW DEVICES FOR BLOOD SAMPLES

This application is the U.S. national phase of International Application No. PCT/FI2016/050543 filed Jul. 25, 2016 which designated the U.S. and claims priority to FI Patent Application No. 20155565 filed Jul. 24, 2015, the entire contents of each of which are hereby incorporated by reference.

FIELD OF INVENTION

The present invention relates to blood separation media and uses thereof. In particular, the present invention concerns a blood separation medium useful as a strip in a lateral flow device, comprising a fibrous web capable of being wet by the blood sample. The present invention also concerns a lateral flow device comprising a strip of present blood separation media typically supported by a backing.

BACKGROUND ART

Blood is made up of two fractions: blood cells and the liquid in which the blood cells are suspended. The liquid is known as blood plasma ("plasma") and is a proteinaceous fluid which may include other smaller cells and dissolved proteins, such as serum albumins, globulins, and fibrinogen), glucose, clotting factors, electrolytes ($Na^+$, $Ca^{2+}$, $Mg^{2+}$, $HCO^{3-}$, $Cl^-$, etc.), hormones, and carbon dioxide. The main cell types present in blood are the red blood cells (erythrocytes), white blood cells and platelets, although other cell types may be detected as well. Erythrocytes constitute about half of the volume of a blood sample.

The separation of red blood cells from the plasma in a blood sample is of great importance for the purpose of rapid diagnosis of plasma constituents in clinics, hospitals and in field conditions, because red blood cells can weaken the sensitivity of the assay. Also the whole blood can cause undesired chemical interference. For example hemoglobin that is released from red blood cells can affect the performance of certain clinical assays due to the iron heme group, which can act as a catalyst.

During the separation of erythrocytes from the fluid fraction it is further important that the red blood cells not lyse or rupture, which may cause the release of internal constituents into the plasma. In order to obtain plasma from whole blood for testing, basically four different kinds of techniques are used, viz. gravity, pressure drop, capillary flow and centrifugal force based techniques.

Assays which are to be performed in field conditions should be inexpensive, and the samples should be disposable. These aims cannot be properly met with some of the techniques mentioned above: pressure drop and centrifugal force require specialized equipment, such pumps and centrifuges making then unsuitable for field use, and gravity based techniques are too slow.

Therefore, assays for separating whole blood into red blood cells and plasma have been developed which are based on capillary flow in lateral flow assay cards. A number of such assays are disclosed in the art.

U.S. Pat. Nos. 4,477,575 and 4,816,224 describe the use of layers of glass microfibers to separate erythrocytes from whole blood. Papers containing 100% glass microfibers of the proposed kind are inherently weak and require extreme care in handling. Although strength can be enhanced through the use of binders, some binders can cause interference with the assay or make the sheet hydrophobic.

Another approach comprises the use of a single-layered medium made of a composite of glass microfibers, cellulose fibers and synthetic staple fibers. In this respect, reference is made to U.S. Pat. No. 5,186,843.

Further filter media are disclosed in US 2012/152859 and US 2003/175153.

Although the blood separation media proposed in the past are suitable for their intended purpose, some improvements are still desired.

Generally, filtration on lateral flow assay cards is hampered by inadequate speed, as whole blood is rather viscous and begins to clot in air. A standard blood filter must have pores smaller than the size of a red blood cell. This is due to the folding that the red blood cells are capable of. When these folded cells pass through the pores some of them become lodged in the pore, blocking it and decreasing the filtration efficiency. This also reduces the number of pores available for the passage of plasma and decreases the total amount of plasma that passes through the filter per unit time.

Further, damage or rupture of the cells may occur. This is especially true if the fiber that makes up the nonwoven is glass, such as the ones suggested above in U.S. Pat. No. 5,186,843.

Glass fibers still give good separation of erythrocytes from blood due to the affinity of red blood cells to glass which provides for efficient slowing up of the erythrocytes in capillary flow.

SUMMARY OF INVENTION

It is an aim of the present invention to eliminate at least a part of the problems relating to known blood separation media.

Thus, it is an object of the present invention to provide novel blood separation media which are capable of slowing up erythrocytes in capillary flow without damage or rupture of the erythrocytes.

It is another object of the present invention to provide a lateral flow device for the separation of plasma from blood, comprising a strip of blood separation media.

A blood separation medium according to the present invention comprises a fibrous web formed by a mixture of glass microfibers and fibrillated fibers. Further the web comprises a binder which at least partially covers glass microfibers of the web, a wetting agent and a salt which is capable of achieving at least partial crenation of red blood cells. The mean flow pore size of the medium is smaller than the average size of red blood cells so as to achieve separation of the red blood cells from the plasma.

A lateral flow device according to the present invention comprises a strip of a blood separation medium arranged upon a backing, preferably a non-water soluble backing and further having a conjugate release pad, an analytical membrane, and an absorbent pad.

The blood separation media can be formed by conventional "wet-laid" processes.

In use, a blood sample may be contacted with the blood separation medium for a time period which is sufficient for separating the erythrocytes therein. Thus, typically, a quantity of, e.g., whole blood is allowed to absorb into the blood separation medium at a contact point and the plasma is allowed to wick from the contact point a greater distance as compared to the erythrocytes. Wicking, i.e. erythrocyte separation from plasma, may occur radially, in other words, parallel to the media surface, or vertically, for example through the thickness of the media, or both radially and vertically.

More specifically, the present invention is mainly characterized by what is stated in the characterizing parts of the independent claims.

The present invention provides a number of advantages. Thus, the invention provides a blood filter medium which is capable of separating red blood cells from the whole blood, in particular on a lateral flow device, effectively without rupturing the red blood cells. The present medium improves the efficiency of the separation of the red blood cells from the plasma and increases the speed and volume of the separated material. The present invention also provides for a decrease in lysing of the red blood cells during the filtration process which results in improved purity of the material.

In the present invention, the glass microfibers, fibrillated fibers and non-fibrillated fibers are typically homogeneously dispersed and form a single layer.

Next, embodiments of the present technology will be examined more closely with reference to the attached drawings.

DESCRIPTION OF EMBODIMENTS

Figure 1:
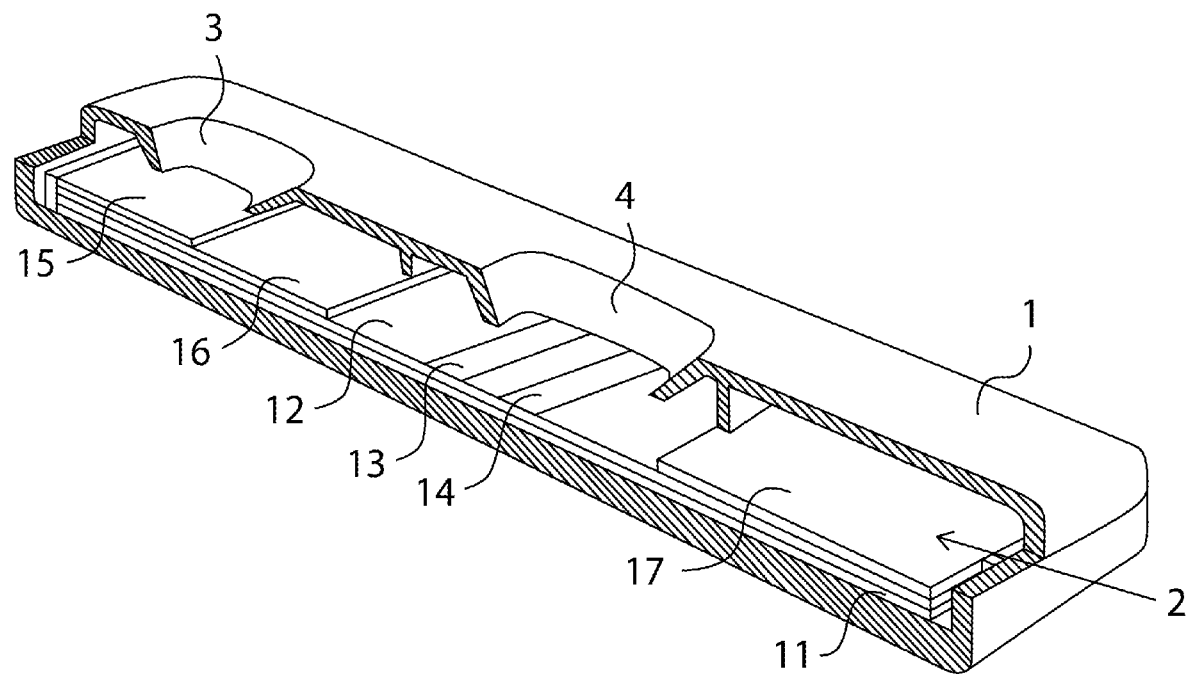
FIG. 1 shows in perspective view a partial cross-section of an embodiment of a lateral flow device.

In the present context, the following definitions are used.

A blood sample is any sample comprising erythrocytes, i.e. Red Blood Cells (in the following also abbreviated "RBCs"), and plasma. The blood sample can be whole blood (WB) that typically comprises RBCs (about 45% by weight), white blood cells, platelets, and plasma (about 55% by weight).

Plasma in whole blood generally comprises water and proteins. Typically plasma contains about 92% water, 7% albumin, gamma globulin, anti-hemophilic factor and other clotting factors along with about 1% mineral salts, sugars, fats, hormones and vitamins, the percentages being calculated from the total weight of blood.

Non-woven stands for a collection of fibers, including filaments and/or staple fibers, in a web or mat which are randomly mechanically interlocked or entangled with one another, in particular mechanically, thermally or chemically.

Glass Microfibers are fine fibers comprising silica and other oxides that have a range in nominal diameter from 0.25 μm to 5 μm, preferably the diameter is less than 1 μm. The microglass fibers as used in the inventive media have a high specific surface area (greater than 1.5 m$^2$/g) and offer a high length/diameter ratio.

Synthetic Fibers are man-made fibers from thermoplastic polymers. Such fibers may be produced by conventional melt-spinning, solution-spinning and like filament production techniques.

Cellulosic Fibers are fibers which contain in large part or completely cellulose, a long chain molecule written in general terms as $(C_6H_{10}O_5)_n$. These cellulosic fibers can include but are not limited to naturally occurring cellulose fibers, such as cotton linters, as well as man-made fibers such as lyocell and other regenerated cellulosic fibers.

Fibrillated Fibers are fibers that have been subjected to mechanical forces resulting microfibrils or "hairs" on the surface of the fiber. Fibrillated fibers are branched structures, irregular in shape offering high anchoring and bonding characteristics. They can be cellulosic fibers, and thermoplastic fibers.

Staple Fiber or cut monofilament fibers means fibers which have been cut to definite, relatively short, segments of predetermined individual lengths. The fibers can be supplied and used in the manufacturing of the nonwoven web as staple fibers or long fibers can be broken up before or during web formation.

Binders can be any water soluble/dispersible polymer. Examples of such binders are vinyl and acrylic binders, latexes, polyvinyl alcohol.

Wetting Agent is a chemical that typically reduces the surface tension of a liquid so that the liquid better coats a surface. Wetting agents are exemplified by surfactant, i.e. compounds that lowers the surface tension between a liquid and a solid or two liquids. Non-limiting examples of wetting agents used in this invention include polysorbates and ionic surfactants such as Triton X-100.

Salts are ionic compounds that dissociate in water. These salts can include both organic and inorganic salts. They include calcium chloride, potassium chloride, sodium chloride, manganese chloride, magnesium chloride, potassium sulfate, and guanidine hydrochloride.

Tonicity is a solution property in reference to a particular membrane. A solution that causes red blood cells to swell and rupture, can be characterized as a hypotonic solution. A solution that causes red blood cells to shrink and become crenated can be characterized as a hypertonic solution. Finally, an isotonic solution does not cause a change in the red blood cells.

Crenate or crenation is the contraction or shrinkage of RBCs as a result of exposure to a hypertonic solution due to the loss of water from the cell by osmosis. The RBCs also become stiff and can no longer deform to accommodate a pore size smaller than normal RBCs.

The term lateral flow device refers to a sample holder, or housing, containing the internal components of the lateral flow device, typically comprising a sample application pad, a conjugate pad, an analytical membrane and an absorbent pad. This is sometimes referred to as a lateral flow assay card.

Turning first to FIG. 1 of the attached drawings it can be noted that a typical lateral flow device comprises a housing 1 which encloses the internal components of the lateral flow device 2. The housing is provided with an aperture for the sample, viz. a sample port 3, as well as a window 4 for visual inspection of the test line 13 and the control line 14 on the analytical membrane 12, respectively.

Figure 2:
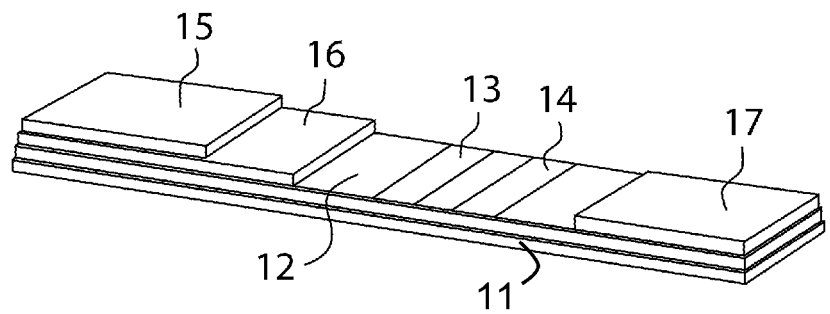
FIG. 2 shows in perspective view the structure of internal components of an embodiment of a simplified lateral flow device.

FIG. 2 shows an example of the internal components of a typical lateral flow device. It comprises an elongated, strip-formed backing 11 upon which there are arranged an analytical membrane 12 with a test line 13 and a control line 14 for the analysis and for detection of the conjugate formed with analyte of the blood sample to be analyzed. On the analytical membrane 12 there is formed in one end a sample application pad, i.e. a blood separation media 15 and a conjugate release pad 16 for activation of the sample or the analyte. At the opposite end of backing 11 there is an absorbent pad 17 for absorbing the plasma which has flowed along the analytical membrane 12.

In use, a blood sample is dropped onto the fibrous web of the sample application pad comprising the blood separator 15. The plasma separation takes place in two consecutive or simultaneous steps. The first step to separate red blood cells from plasma involves absorption of the blood sample into the sample pad/blood separation media, where the sample spreads radially, as well as down into the pad, as it is absorbed. The second step uses horizontal action and capillary flow to continue the separation thus transporting the plasma to the conjugate pad while leaving the RBCs behind.

Naturally, the structures shown in the drawings are merely examples of possible embodiments according to the present technology.

The fibrous web of the sample application pad and optionally of the conjugate release pad comprises a blood separation medium of the present technology. It is basically formed by a web containing first fibers selected from glass microfibers and second fibers selected from fibrillated fibers.

In a specific embodiment, the fibrous web is a non woven web. In such a web, the fibers, the glass microfibers and the fibrillated fibers, are mechanically interlocked or entangled with one another. In addition, the fibers are also chemically interlocked by the use of a binder, as will be discussed below.

In one embodiment, the fibrous web is wet laid. In such a method, an aqueous slurry of the fibers may be formed and then subsequently dewatered to produce a non-woven web comprised of a mixture of glass microfibers and fibrillated fibers.

The fibrous web typically contains 50 to 99 parts by weight, in particular 70 to 98 parts by weight of the glass microfibers. It contains further 1 to 50 parts by weight, in particular 2 to 30 parts by weight of the second, fibrillated fibers.

Conventionally, the glass microfibers and the fibrillated fibers are mixed together, typically such that the latter are evenly distributed throughout the web. Thus, in one embodiment, the fibrous web comprises nonwoven layer of glass microfibers and second fibers, which layer contains the glass microfibers and second fibers evenly mixed.

In one embodiment, the glass microfibers are long discontinuous glass microfibers having a random distribution of fiber lengths resulting from the processing of such small diameters, up to 5 μm. The diameter of the glass microfibers is typically 5 μm or less, for example in the range of 0.1 to 5 μm. Typically, the glass microfibers have a diameter in the range of about 0.25 μm to about 1.5 μm, preferably 0.4 μm to 1.0 μm.

In one embodiment, the glass microfibers have a high specific surface area (greater than 1.5 m$^2$/g, for example greater than 2 m$^2$/g, in particular greater than 2.4 m$^2$/g, for example about 2.4 to 2.6 m$^2$/g. They exhibit a high length/diameter ratio. The length/diameter ratio is commonly greater than 6, in particular greater than 20, suitably greater than 50, for example 100 or more, often 500 or more. Thus, length to diameter ratios of about 750 to about 25,000 are possible.

Thus, in one embodiment, glass microfibers according to the present technology meet one or several, preferably all, of the following criteria:
  a diameter of 5 μm or less, preferably 0.4-1 μm;
  a specific surface area greater than 1.5 m$^2$/g, for example greater than 2 m$^2$/g; and
  a length/diameter ratio of 100 or more, in particular 500 or more.

Although the present technology particularly concerns the use of glass microfibers in fibrous web for forming blood separation media, it should be pointed out that instead of or—preferably—in addition to glass microfibers as first fibers the present blood separation media also provides for the use of other fibers which exhibit blood affinity, or more specifically affinity of the fiber surfaces towards red cells. Thus, non-fibrillated polymeric fibers can be employed instead of or combined with the glass microfibers.

Examples of materials from which non-fibrillated polymeric fibers can be produced include polyesters, polypropylenes, polyethylenes, poyacrylonitriles (acrylics), and polyamides (nylons, for example, nylon-6, nylon 6,6, nylon-6,12, and the like).

With regard non-glass microfibers for use in the present fibrous web, reference is made to the non-fibrillated thermoplastic fibers disclosed in U.S. Pat. No. 7,228,973, the entire content of which is expressly incorporated hereinto by reference.

In one embodiment, the non-glass fibers have a high specific surface area. The specific surface area of the non-glass fibers can be greater than 1.5 m$^2$/g, for example greater than 2 m$^2$/g, in particular greater than 2.4 m$^2$/g. The non-glass fibers exhibit a high length/diameter ratio. The length/diameter ratio is commonly greater than 6, in particular greater than 20, suitably greater than 50, for example 100 or more, often 500 or more. Thus, length to diameter ratios of about 750 to about 25,000 are possible.

Typically, the glass microfibers, potentially in combination with other blood affinity providing non-fibrillated fibers, form a majority of the fibers of the fibrous web. In combination with the second (and further) fibers they will give a web which has a pore size which achieves separation of the red blood cells from the plasma.

In one embodiment, the pore size of a blood separation medium is generally smaller than that for normal RBCs (6 to 8 μm). Healthy RBCs can deform in order to pass through small capillaries (about 8 μm) in the human body, but a medium with a pore size in the range of 3-10 μm, preferably 4-6 μm will slow down and hold back the RBCs from traveling with the plasma. Additionally, RBCs are attracted to the positive charge/nature of the glass microfibers, further slowing down their progress compared to the plasma.

In the above, the term "pore size" stands for mean flow pore size as determined according to ASTM F316-03 (2011). In the examples below, the mean flow pore size was determined using a Quantachrome 3G series analyzer, supplied by Quantachrome Instruments, Boynton Beach, Fla., USA.

Surface affinity can be defined as the reduction in free energy per unit area of the interface associated with the formation of adhesive contact. In an embodiment, blood cell affinity is a qualitative property of red blood cells to adhere to microglass or other non-fibrillated fibers (in particular the surfaces thereof) such that a slowing up of the movement of the red blood cells takes place relative to the movement of the plasma.

Affinity can be expressed in the units of surface tension (erg/cm$^2$). In one embodiment, the affinity varies in the range from about 10$^{-4}$ erg/cm$^2$ to 10 erg/cm$^2$, although these values are not absolute limits.

The fibrous web further contains at least one kind of fibers different from the first fibers (glass microfibers) discussed above. Such second fibers are typically fibrillated.

In one embodiment, the second fibers are selected from non-synthetic fibers, such as cellulosic fibers. Such cellulosic fibers can be selected from the group of fibrillated cellulosic fibers. The fibers can also be purified or pre-refined.

In one embodiment, the cellulosic fibers comprise regenerated fibers or natural fibers or combinations thereof. The cellulosic fibers are selected from the group of cotton linters, lyocell, fibrillated lyocell and viscose fibers.

The second fibrous component can be formed by combinations of fibers. Thus, the web can comprise a combination of two different kinds of fibers, e.g. natural cellulosic fibers in combination with regenerated cellulosic fibers. The weight ratio of natural fibers to regenerated fibers is generally about 20:1 to 1:20, in particular 10:1 to 10:10, for example 8:1 to 2:1.

Examples of suitable mixtures of natural fibers and regenerated cellulosic fibers include mixtures of cotton linters or chemical pulp—or mixtures thereof—with rayon, viscose or lyocell fibers or mixtures thereof.

Both natural and regenerated cellulosic fibers, such as cotton and lyocell fibers, add strength to the glass media. A tensile strength beyond that provided by the glass microfibers is typically needed for processing. Notable is that already small amount of regenerated fibers, in particular lyocell fibers increase the strength disproportionately compared to other fiber choices at similar percentages, thus allowing for more glass in the media. Based on this finding, the content of regenerated fibers such as lyocell fibers can amount to, for example, about 0.5 to about 10%, in particular about 1 to about 7.5% of the total weight of the fibers of the fibrous web.

The fibrillated fibers, in particular cellulose or cotton fibers as well as regenerated fibers also improve the wettability of the medium.

In specific embodiments of the present technology, the fibrous web further contains a binding component and salt. In one embodiment, a polymeric binder is applied onto the fibrous web to produce a web having a predetermined tensile strength.

In particular, the web contains a polymeric, preferably hydrophilic binder. A hydrophilic binder will have good adherence in particular to the second fibers of the web and thereby improve tensile strength of the web, such as a nonwoven web.

The polymeric binder is selected from the group of acrylate latexes, poly(vinyl alcohol) and poly(vinyl acetate) and similar water soluble or water dispersible polymers.

The polymeric binder is present at a concentration of 0.1 to 10 parts, in particular 0.5 to 5 parts polymeric binder per 100 parts of the total amount of fibers forming the fibrous web.

The amount of polymeric binder is sufficient to cover at least a part of the glass microfibers. As a result, in practice the ends of at least a portion of the glass microfibers are covered by the binder. As a result, lysing of red blood cells as they pass through the separation medium is reduced or prevented.

Binder concentrations of at least 0.5 and up to 5 parts by weight or less are particularly advantageous since they efficiently decrease lysing of microfiber ends while still in practice avoiding the risk of the binder causing clogging of the medium.

In one embodiment, the web also contains a salt which is capable of achieving at least a partial crenation of the red blood cells.

In one embodiment, the salt is selected from the group of salts capable of increasing the tonicity of the plasma. In particular the salt is selected from the group of alkali metal and alkaline earth metal halogenides and sulfates, such as calcium chloride and potassium sulfate, and hydrochlorides of organic bases, such as guanidine hydrochloride. Other suitable salts are manganese chloride, potassium chloride, magnesium chloride, and sodium chloride.

The salt is impregnated into the fibrous web in particular by drying an aqueous salt solution that has been applied onto the fibrous web.

The salt is present at concentrations of about 1 to 25% of the total weight of the medium, preferably 10-20% of the total weight of the medium. Calculated based on 100 parts of weight of the total amount of fibers of the fibrous web, the salt concentration is typically 10 to 20 parts.

It is believed that the binder prevents lysing of the red blood cells as the sample enters the media because sharp edges of the glass microfibers are coated with said binder, then as the salt is solubilized by the sample, the salt causes the RBCs to crenate and these crenated RBCs are filtered out mechanically by the pores in the media. Thus the improvement in minimized lysing is a result of both the binder protecting any sharp edges of the short cut glass microfibers and the salt causing the RBCs to crenate.

By the combined effect of binder and salt, an improvement in the blood separation efficiency is attained which is seen as reduced lysing and increased separation.

The medium is capable of being wet by a sample of blood, for example a blood sample containing one or more of plasma, red blood cells, white blood cells, and white blood platelets. This allows for its use in practical applications, In one embodiment, the medium of a size typical of a sample application pad, 4 mm×16 mm×340 µm, is capable of processing at least 100 µL of a blood sample, e.g. whole blood, and lead to an efficient plasma separation.

As discussed above, the present technology provides blood separation media, which—as such—have a good capability of being wet. To further improve wetting of the material, the fibrous web can contain at least one wetting agent.

In one embodiment, the wetting agent is selected from surfactants, in particular polysorbates, such as Polysorbate 20, Polysorbate 40, Polysorbate 60 or Polysorbate 80, or non-ionic surfactants, such as polyethylene glycol p-(1,1,3,3-tetramethylbutyl)-phenyl ether, such as Triton X-100, or poloxamers.

In one embodiment, the salt used is potassium sulfate and the wetting agent is selected from polysorbates. The latter is typically used as an emulsifying wetting agent.

The wetting agent is applied on a fibrous web formed by fibrous cellulosic fibers and glass microfibers and at least one binder component. Preferably it is applied so as to provide an even distribution of the wetting agent throughout the web.

In one embodiment, the concentration of the wetting agent is 0.1 to 15 parts, in particular 0.5 to 5 parts of the wetting agent per 100 parts by weight of the total amount of fibers forming the fibrous web.

As both the wetting agent and the salt are soluble in water, in one embodiment, they are applied together on the fibrous web, for example during conventional production of a wet laid fibrous web, although this is not a strict processing requirement.

In one particular embodiment, the wetting agent and salt are applied together as a coating on the fibrous web after application of the binder.

The basis weight of the fibrous web containing the fibers together with one or more of binder, salt and wetting agent can vary widely. Typically, the basis weight is in the range of about 10 to about 300 $g/m^2$, for example about 50 to 200 $g/m^2$, such as about 75 to 175 $g/m^2$, although these values are no absolute limits.

The thickness of the fibrous web is typically in the range from 10 to 1500 μm, in particular about 50 to 1000 μm, for example about 100 to 750 μm, suitably about 250 to 700 μm.

In one embodiment, the blood separation medium can be laminated on a backing, for example on a polymer film or tissue, for improved strength. Thus, in one alternative a medium according to any of the preceding embodiments, is laminated to a polyester spunbond with a polypropylene spunbond that acts as an adhesive.

In one specific embodiment, which can be combined with all above embodiments, the present technology utilizes a singular layer of a fibrous web comprising glass microfibers, fibrillated fibers and non-fibrillated fibers, all of which are homogeneously distributed within the media and which form one layer. Thus, the fibrous web is formed by the first and second fibers that also contains the binder, wetting agent and salt and that also exhibits the specific pore size discussed above. Thus, the fibers and the other components are present in one and the same web.

The following non-limiting examples will illustrate the present technology.

EXAMPLES

Test Methods

Plasma in Window: This is the time it takes to visually see the sample's tide line at the initial edge of the window (Test Line side) of the lateral flow device after a sample has been added to the Sample Port.

Blood Absorbance is the length of time between when a 100 μL whole blood sample is deposited through the Sample Port onto the blood separation media housed in a lateral flow device and when it has been completely absorbed into the sample pad.

Test Line Sensitivity: A whole blood sample (100 μL) is added to the sample port and after 9 minutes inserted into an ICA-1000 Immuno-chromatographic Reader [Hamamatsu Photonics]. The Test Line Sensitivity is reported in units of Spectroscopic Absorbance (ABS) based on the color intensity (absorbance) in the red or blue region Control Line Sensitivity: A whole blood sample (100 μL) is added to the sample port and after 9 minutes inserted into an ICA-1000 Immuno-chromatographic Reader [Hamamatsu Photonics]. The Control Line Sensitivity is reported in units of Spectroscopic Absorbance (ABS) based on the color intensity (absorbance) in the red or blue region Dry and Wet Tensile Strength: The tensile strength of the treated media was tested according to TAPPI 494 om-01 and reported in lb/in (1 kN/m=5.7 lb/in).

The mean flow pore size was determined according to ASTM F316-03 (2011) using a Quantachrome 3G analyzer. The instrument adjusts for thickness and saturate used. For the analysis of Examples 1 and 2, the saturate was Porofil® Wetting Solution (available from Quantachrome, Corp.).

Purity of Plasma in the test area: A solution comprising gum Guaiac is applied to the test area [4 in FIG. 1] with a sterile nylon swap (FLOQSwabs). If the solution remains a blend of green and brown color, there is no iron present. If the solution turns blue, this indicates that some of the red blood cells were lysed and has contaminated the test area.

Comparative Example

A comparative lateral flow device sample was assembled using a commercially available blood separator medium comprising 60% bleached softwood sulfate cellulose pulp and 40% glass microfibers, having a basis weight of 70 gsm and a thickness of 304 μm.

Examples

Examples of the present treated blood separation media that provide (a range of) acceptable pore size(s) are disclosed in Examples 1 and 2:

Example 1

A 70 gsm wet laid fibrous web having a thickness of 340 μm was made from a homogeneous blend of 20% cotton linters (GP 225HSR available from Georgia Pacific) having a Canadian Standard Freeness (CSF) of 615, 5% fibrillated lyocell having a CSF of 40 (available from Engineered Fibers Technology, USA), and 75% glass microfibers having an average diameter of 0.8 μm (Grade B-08-F available from Lauscha Fiber International). A vinyl acetate binder (Vycar® VA 1022, Lubrizol) was applied to the web at a concentration of 1% of the weight of the fibrous web. A wetting agent (polyoxyethylene sorbitan monooleate, also known as Polysorbate 80) was applied to the web at a dry weight add-on of 0.7 gsm. A potassium sulfate solution was applied such that the dry weight add-on of potassium salt is 9.87 gsm. The mean flow pore size of the treated media is 4.9 μm.

Example 2

A 70 gsm wet laid fibrous web having a thickness of 340 μm was made from a homogeneous blend of 20% cotton linters (GP 225HSR available from Georgia Pacific) having a Canadian Standard Freeness (CSF) of 615.5% fibrillated lyocell having a CSF of 40 (available from Engineered Fibers Technology, USA), and 75% glass microfibers having an average diameter of 0.8 μm (Grade B-08-F available from Lauscha Fiber International). A vinyl acetate binder (Vycar® VA 1022, Lubrizol) was applied to the web at a concentration of 1% based on the weight of the fibrous web. A wetting agent (polyoxyethylene sorbitan monooleate, also known as Polysorbate 80) was applied to the web at a dry weight add-on of 0.7 gsm. Guanidine hydrochloride solution was applied such that the dry weight add-on of guanidine hydrochloride is 9.87 gsm. The mean flow pore size of the treated media is 4.9 μm.

TABLE 1

Properties of tested blood separation media

| Material | Plasma in Window (sec) | Blood ABS (min) | Test Line Sensitivity (ABS) | Control line Sensitivity (ABS) | Tensile Strength Dry (lb/in) | Tensile Strength Wet (lb/in) |
|---|---|---|---|---|---|---|
| Comparative Example | 74 | 12 | 0.0650 | 0.5025 | N/A | N/A |

TABLE 1-continued

Properties of tested blood separation media

| Material | Plasma in Window (sec) | Blood ABS (min) | Test Line Sensitivity (ABS) | Control line Sensitivity (ABS) | Tensile Strength Dry (lb/in) | Tensile Strength Wet (lb/in) |
|---|---|---|---|---|---|---|
| Example 1 | 32 | 1 | 0.1148 | 0.6182 | 3.31 [0.58 kN/m] | 1.39 [0.24 kN/m] |
| Example 2 | 30 | 1 | 0.1547 | 0.7866 | 3.31 [0.58 kN/m] | 1.39 [0.24 kN/m] |

Both Examples 1 and 2 show much faster absorption of the blood sample as well as a much shorter time to reach the edge of the window in the lateral flow device compared to the Comparative Example. It took less than half the time for the plasma to reach the edge of the window in the lateral flow device for the inventive media examples compared to the commercially available media. In addition, the line sensitivity for both the test and the control was better for both Examples 1 and 2 compared to the commercially available media. Both the speed and sensitivity are needed to quickly and accurately process samples.

Several competitive samples show poor purity in plasma separation which was proven by iron contamination.

Further, on the plasma purity test, the new blood separation media of the above examples stay greenish brown which shows that they provide for purer separation than the comparative conventional materials.

INDUSTRIAL APPLICABILITY

The present filter media can be used generally as medical filters. In particular, the present media can be used in a lateral flow device for the separation of plasma from blood.

REFERENCE SIGNS LIST 1 housing
2 lateral flow device
3 sample port
4 window
11 backing
12 analytical membrane
13 test line
14 control line
15 blood separation medium
16 conjugate release pad
17 absorbent pad

CITATION LIST

Patent Literature

U.S. Pat. No. 4,477,575
U.S. Pat. No. 4,816,224
U.S. Pat. No. 5,186,843.
US 2012/152859
US 2003/175153

Non-Patent Literature

ASTM F316-03 (2011)

The invention claimed is:
1. A blood separation medium comprising
a fibrous web formed by first fibers at least a part of which are selected from glass microfibers, non-fibrillated fibers having an affinity for red blood cells and combinations thereof, and second fibers selected from fibrillated fibers;
said fibrous web containing a polymeric, hydrophilic binder, a wetting agent and a salt; and
wherein said fibrous web has a mean flow pore size smaller than the average size of red blood cells.

2. The blood separation medium according to claim 1, wherein the fibrous web is wet laid and comprises 50 to 99 parts by weight of said first fibers, and 1 to 50 parts by weight by weight of said second fibers.

3. The blood separation medium according to claim 1, wherein the fibrous web has a mean flow pore size of 3 to 7 μm.

4. The blood separation medium according to claim 1, wherein said second fibers are evenly mixed with said first fibers.

5. The blood separation medium according to claim 1, wherein said second fibers are selected from non-synthetic fibers, such as cellulosic fibers.

6. The blood separation medium according to claim 1, wherein the cellulosic fibers comprise regenerated fibers or natural fibers or combinations thereof.

7. The blood separation medium according to claim 1, wherein the cellulosic fibers are selected from the group of cotton linters, lyocell and viscose fibers.

8. The blood separation medium according to claim 1, wherein the glass microfibers meet one or several of the following criteria:
a diameter of 5 μm or less;
a specific surface area greater than 1.5 $m^2/g$; and
a length/diameter ratio of 100 or more.

9. The blood separation medium according to claim 1, wherein the polymeric binder at least partially covers glass microfibers of the web.

10. The blood separation medium according to claim 1, wherein the polymeric binder is selected from the group of acrylate latexes, poly(vinyl alcohol) and poly(vinyl acetate) and similar water soluble or water dispersible polymers.

11. The blood separation medium according to claim 1, wherein the polymeric binder is present at a concentration of 0.1 to 10 parts by weight of polymeric binder per 100 parts by weight of the fibers forming the fibrous web.

12. The blood separation medium according to claim 1, wherein the amount of polymeric binder is sufficient to cover the ends of at least a portion of the glass microfibers thus to prevent lysing of red blood cells as they pass through the separation medium.

13. The blood separation medium according to claim 1, wherein wetting agents is selected from surfactants, polysorbates, such as Polysorbate 20, Polysorbate 40, Polysorbate 60 or Polysorbate 80, non-ionic surfactants, polyethylene glycol p-(1,1,3,3-tetramethylbutyl)-phenyl ether, Triton X-100, poloxamers, and mixtures thereof.

14. The blood separation medium according to claim 1, wherein the wetting agent is applied on the fibrous web formed by cellulosic fibers and glass microfibers in a concentration of 0.5 to 5 parts per weight, counted from the weight of the fibers.

15. The blood separation medium according to claim 1, wherein wetting agents is applied on a fibrous web formed by fibrous cellulosic fibers and glass microfibers and at least one binder component.

16. The blood separation medium according to claim 1, wherein the salt is capable of achieving at least partial crenation of red blood cells.

17. The blood separation medium according to claim 1, wherein the salt is selected from the group of alkali metal and alkaline earth metal halogenides and sulfates, such as calcium chloride and potassium sulfate, and hydrochlorides of organic bases, such as guanidine hydrochloride.

18. The blood separation medium according to claim 1, wherein the salt is impregnated into the fibrous web by drying of an aqueous salt solution applied onto the fibrous web.

19. The blood separation medium according to claim 1, wherein the salt is present at concentrations of about 1 to 25% of the total weight of the media.

20. The blood separation medium according to claim 1, said media being capable of being wet by a sample of blood, for example a blood sample containing one or more of plasma, red blood cells, white blood cells, and white blood platelets.

21. The blood separation medium according to claim 1, wherein a typical size of a sample application pad is capable of processing at least 100 µL of a blood sample, such that there are few, if any, red blood cells within the plasma as it flows into the conjugate pad.

22. A lateral flow device for the separation of plasma from blood, wherein is comprises a blood separation medium according to claim 1.

23. The lateral flow device according to claim 22, comprising the blood separation medium arranged upon a backing.

24. The lateral flow device according to claim 22, comprising a conjugate release pad, an analytical membrane, and an absorbent pad.

25. The lateral flow device according to claim 24, wherein a typical size of a sample application pad is capable of processing at least 100 µL of a blood sample, such that there are few, if any, red blood cells within the plasma as it flows into the conjugate pad.

26. A method of using a blood separation medium according to claim 1 in a lateral flow device for the separation of plasma from blood, comprising applying a sample comprising blood to the blood separation medium in the lateral flow device to separate plasma in the blood from red blood cells in the blood.

* * * * *